(12) United States Patent
Guo et al.

(10) Patent No.: US 12,062,975 B2
(45) Date of Patent: Aug. 13, 2024

(54) OUTPUT SHORT-CIRCUIT PROTECTION METHOD, POWER MANAGEMENT CHIP AND SWITCHED-MODE POWER SUPPLY

(71) Applicant: SHANGHAI BRIGHT POWER SEMICONDUCTOR CO., LTD., Shanghai (CN)

(72) Inventors: Yanmei Guo, Shanghai (CN); Zhen Zhu, Shanghai (CN); Yuehui Li, Shanghai (CN); Xiaoru Gao, Shanghai (CN); Yihui Chen, Shanghai (CN); Haifeng Miao, Shanghai (CN); Rulong Jiang, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 239 days.

(21) Appl. No.: 17/884,826

(22) Filed: Aug. 10, 2022

(65) Prior Publication Data

US 2023/0049884 A1 Feb. 16, 2023

(30) Foreign Application Priority Data

Aug. 12, 2021 (CN) .......................... 202110925228.1

(51) Int. Cl.
*H02M 1/32* (2007.01)
*H02M 1/08* (2006.01)
(52) U.S. Cl.
CPC .............. *H02M 1/32* (2013.01); *H02M 1/08* (2013.01)

(58) Field of Classification Search
CPC ...... H03K 5/1534; H03K 17/26; H03K 17/08; H03K 17/082; H02M 1/32; H02M 1/0041; H02M 1/08
See application file for complete search history.

(56) References Cited

U.S. PATENT DOCUMENTS

| | | | | |
|---|---|---|---|---|
| 5,757,635 | A * | 5/1998 | Seong | H02M 1/4225 363/80 |
| 6,144,245 | A * | 11/2000 | Balogh | H03K 17/161 327/380 |
| 11,196,334 | B2 * | 12/2021 | Sato | H02M 3/335 |
| 2010/0007409 | A1 * | 1/2010 | Wang | H03K 17/0822 327/551 |
| 2013/0057323 | A1 * | 3/2013 | Spini | H02M 3/33553 327/142 |

* cited by examiner

*Primary Examiner* — Gary L Laxton
(74) *Attorney, Agent, or Firm* — MUNCY, GEISSLER, OLDS & LOWE, PC (57) ABSTRACT

An output short-circuit protection method, a power management chip and a switched-mode power supply are disclosed. When current accumulation has occurred in a power transistor, the number of consecutive current pulses during which the current accumulation occurred is counted. Upon the number of consecutive current pulses reaches a preset value, a regulation interval spanning switching periods is triggered, for at least some of the switching periods, the leading-edge blanking time is shortened or cancelled. In this way, an excessively large current flowing through the power transistor is prevented. Compared with existing fault response measures for power management chips, restart of the power supply and adjustment of the system timing are not needed, allowing easier implementation. Further, the automatic restart during chip start up due to false triggering as found in the existing measures for power management chips is circumvented.

10 Claims, 7 Drawing Sheets

OUTPUT SHORT-CIRCUIT PROTECTION METHOD, POWER MANAGEMENT CHIP AND SWITCHED-MODE POWER SUPPLY

CROSS-REFERENCES TO RELATED APPLICATIONS

This application claims the priority of Chinese patent application number 202110925228.1, filed on Aug. 12, 2021, the entire contents of which are incorporated herein by reference.

TECHNICAL FIELD

The present invention relates to the field of power supply technology and, in particular, to an output short-circuit protection method, a power management chip and a switched-mode power supply.

BACKGROUND

Figure 1:
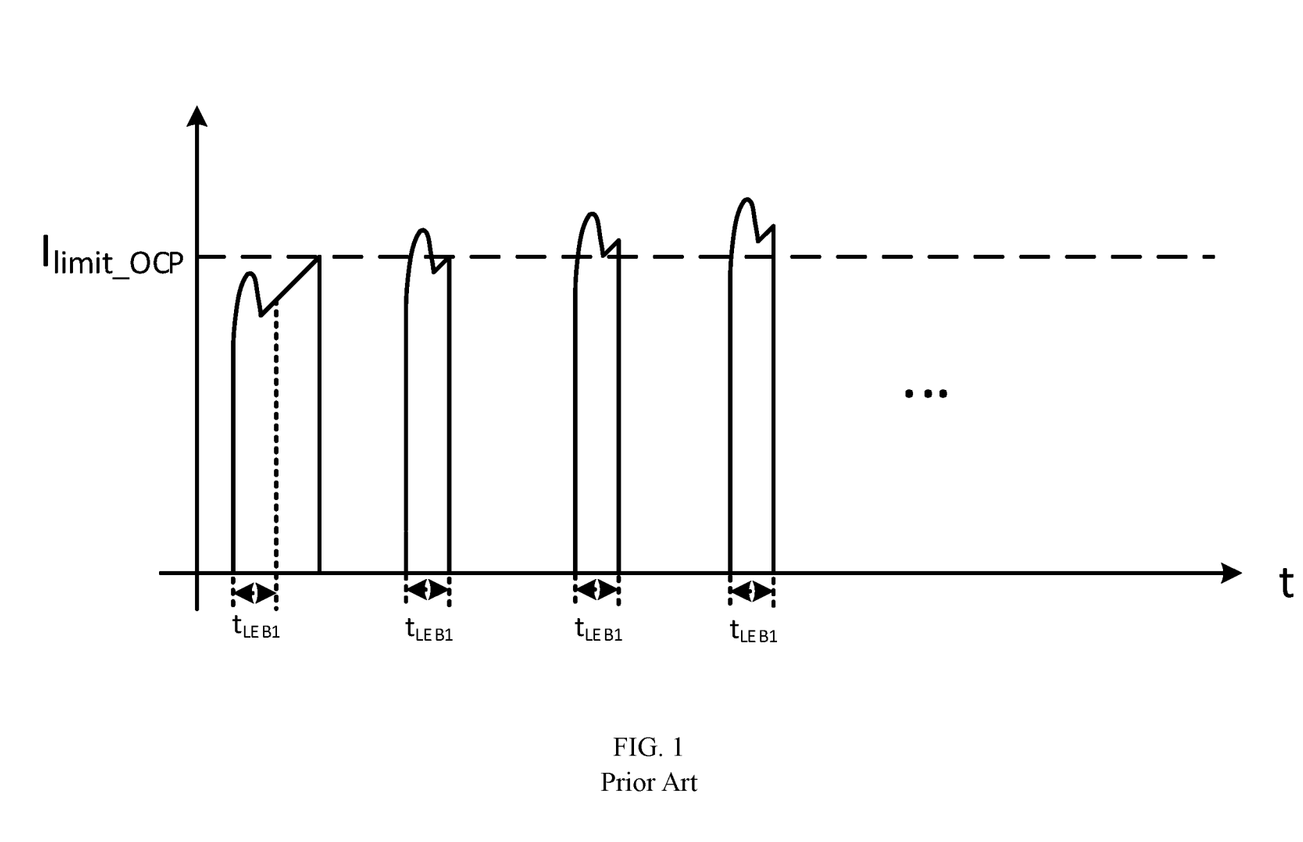
FIG. 1 is a schematic diagram showing a current waveform in a power transistor when current accumulation in the power transistor is caused by an output short-circuit.

An output short-circuit test forms a mandatory part of a power module testing and assessment phase. It requires the power module under test not to break down in the event of an output short-circuit and return to normal operation after the fault has been cleared away. If no output short-circuit protection measure is taken, then in the event of an output short-circuit, the output voltage will drop to 0, and the power management chip will drive, at its maximum permissible switching frequency, a power transistor for energy output regulation in the switched-mode power supply. At the same time, a conduction time of the power transistor is minimized (i.e., a short conduction time which is generally close to a leading-edge blanking time $t_{LEB1}$). In the event of the output short-circuit, inductor demagnetization would become impossible, leading to a high likeliness of current accumulation in the power transistor to a level exceeding a permissible limit of the power transistor. As an example, FIG. 1 illustrates current accumulation in a power transistor in a flyback converter caused by an output short-circuit. In FIG. 1, $I_{limit\_OCP}$ denotes a period-wise overcurrent protection threshold. Referring to FIG. 1, the output short-circuit gives rise to short current pulses and period-wise current accumulation. When the current in the power transistor exceeds a limit, breakdown of the power transistor and hence the entire power supply would be very likely to happen.

In order to avoid breakdown in the event of an output short-circuit, it is necessary to provide the power management chip with output short-circuit protection. Measures adopted by existing power management chips against a detected output short-circuit typically rely on automatic restart or clock shutdown. However, as these measures require adjustments in operation of the power supply and clock, they are difficult to implement, and false triggering of automatic restart tends to happen during chip start-up.

SUMMARY OF THE INVENTION

In order to address the shortcomings of the existing output short-circuit protection measures, the present invention proposes an output short-circuit protection method. Also proposed are a power management chip and a switched-mode power supply.

In a first aspect, the present invention provides an output short-circuit protection method for control of currents flowing through a power transistor in a switched-mode power supply. The output short-circuit protection method includes:

performing period-wise overcurrent protection for currents flowing through the power transistor using a leading-edge blanking time, detecting whether current accumulation has occurred in the power transistor, counting a number of consecutive current pulses during which the current accumulation has occurred, and when the number of consecutive current pulses reaches a preset value, entering a regulation interval comprising at least one switching period, wherein at least some leading-edge blanking time thereof is shortened or cancelled; and after the regulation interval, restoring the leading-edge blanking time and reentering period-wise overcurrent protection.

Optionally, the regulation interval may last for a predetermined length of time or for a predetermined number of switching periods.

Optionally, detecting whether current accumulation has occurred in the power transistor may be accomplished either by detecting a duration of a conduction time for the power transistor and determining the occurrence of current accumulation if the duration is short, or by detecting a current flowing through the power transistor and determining the occurrence of current accumulation if a short-circuit protection threshold is reached.

Optionally, the period-wise overcurrent protection may include period-wisely limiting currents flowing through the power transistor using an overcurrent protection threshold by switching off the power transistor if the current flowing through the power transistor reaches the overcurrent protection threshold after the leading-edge blanking time, wherein the short-circuit protection threshold is higher than the overcurrent protection threshold.

In another aspect, the present invention provides a power management chip for controlling of currents flowing through a power transistor in a switched-mode power supply. The power management chip includes:

a drive generation module configured to perform period-wise overcurrent protection for currents flowing through the power transistor using a leading-edge blanking time and to generate a control signal for the power transistor; and a current accumulation detection module configured to detect whether current accumulation has occurred in the power transistor, count a number of consecutive current pulses during which the current accumulation has occurred, enter a regulation interval comprising at least one multiple switching period if the number of consecutive current pulses reaches a preset value, wherein at least some leading-edge blanking time during the regulation interval is shortened or cancelled, and after the regulation interval, restore the leading-edge blanking time as not be shortened or cancelled.

Optionally, the current accumulation detection module may include:

a short conduction time detection unit configured to detect whether a current pulse flowing through the power transistor is a short current pulse;

a first counting unit configured to count the number of consecutive short current pulses detected by the short conduction time detection unit; and a leading-edge blanking time control unit configured to send a leading-edge blanking time signal to the drive generation module and, if the counted number generated by the first counting unit reaches the preset value, shorten the leading-edge blanking time during the regulation interval from a value prior to the regulation interval.

Optionally, the current accumulation detection module may include:

a short-circuit threshold triggering unit configured to detect whether a current flowing through the power transistor reaches a short-circuit protection threshold;

a second counting unit configured to count the number of consecutive current pulses during which the short-circuit protection threshold is reached as detected by the short-circuit threshold triggering unit; and a leading-edge blanking time control unit configured to send a leading-edge blanking time signal to the drive generation module and, if the counted number generated by the second counting unit reaches the preset value, shorten the leading-edge blanking time during the regulation interval from a value prior to the regulation interval.

Optionally, the drive generation module may include:

a period-wise overcurrent protection unit configured to perform period-wise overcurrent protection during the leading-edge blanking time for current flowing through the power transistor and generate a trigger signal; and a control signal generation unit configured to receive the trigger signal and a clock signal for controlling an operating frequency of the power transistor and generate a control signal for the power transistor.

Optionally, the regulation interval may last for a predetermined length of time or for a predetermined number of switching periods.

In yet another aspect, the present invention provides a switched-mode power supply including the power management chip as defined above for control of currents flowing through a power transistor and prevention of an excessively large current flowing through the power transistor.

In the output short-circuit protection method, power management chip and switched-mode power supply provided in the present invention, through shortening or cancelling the leading-edge blanking time for at least some switching periods in the regulation interval, a conduction time of the power transistor in the regulation interval is effectively shortened, preventing an excessively large current flowing through the power transistor. Compared with existing measures for power management chips, restart of the power supply and adjustment of the system clock are not needed, allowing easier implementation. Further, the automatic restart during chip start up due to false triggering as found in the existing measures for power management chips is circumvented.

DETAILED DESCRIPTION

The output short-circuit protection method, power management chip and switched-mode power supply proposed in the present invention will be described in greater detail below with reference to the accompanying drawings and specific embodiments. From the following description, advantages and features of the present invention will become more apparent. Note that the drawings are provided in a very simplified form not necessarily drawn to exact scale for the only purpose of helping to explain the disclosed examples in a more convenient and clearer way.

Embodiments of the present invention relate to an output short-circuit protection method, which is provided to control currents flowing through a power transistor in a switched-mode power supply so as to avoid excessive current accumulation in the power transistor as a result of an output short-circuit. Here, the "power transistor" refers to a transistor which is provided in the switched-mode power supply for energy output regulation through being periodically switched on and off by a drive signal. Here, the "output short-circuit" refers to a low output voltage beyond a safe operation range, which is, for example, 0.

Figure 2:
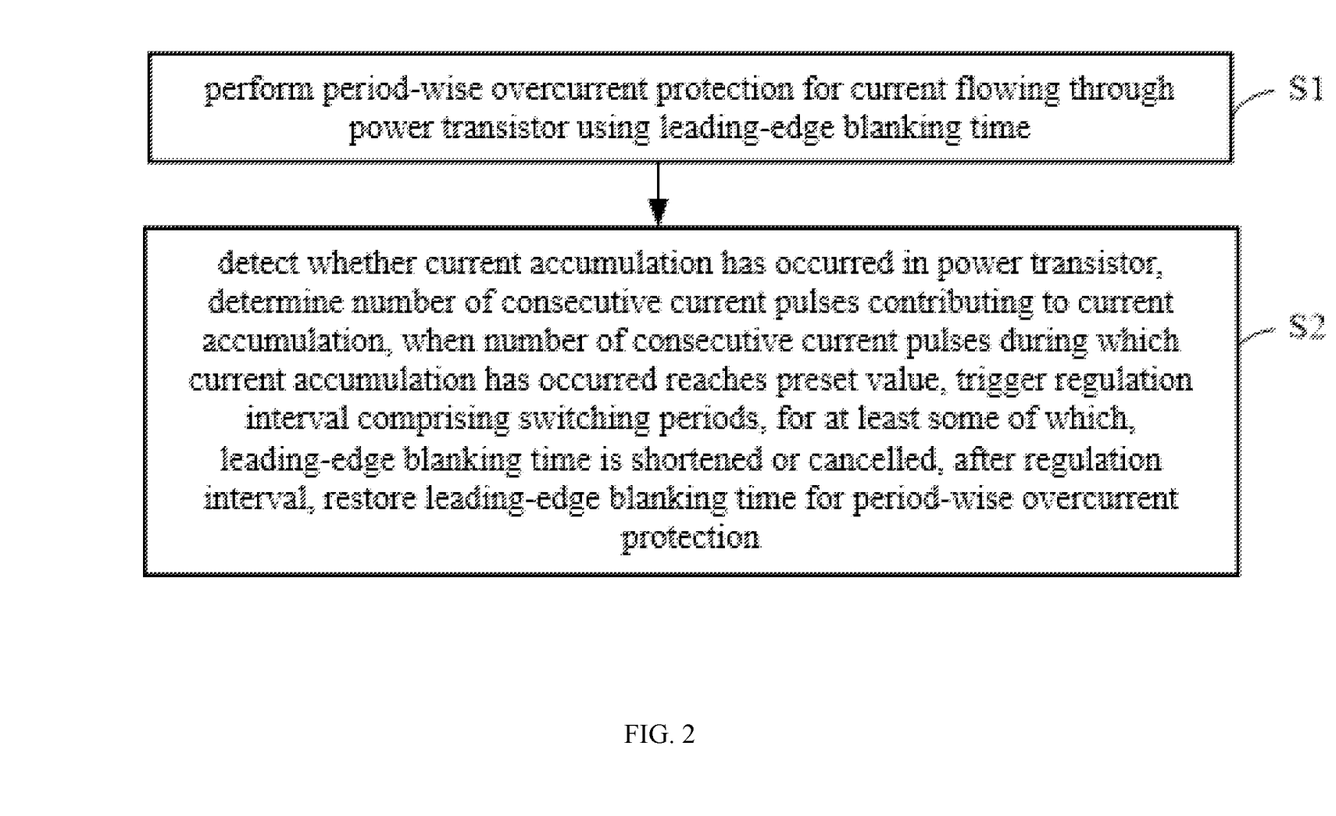
FIG. 2 is a schematic flow diagram of an output short-circuit protection method according to an embodiment of the present invention.

FIG. 2 is a schematic flow diagram of the output short-circuit protection method according to an embodiment of the present invention. Referring to FIG. 2, the output short-circuit protection method includes the step below.

In a first step S1, period-wise overcurrent protection using a leading-edge blanking time is provided to the power transistor for a current flowing through the power transistor.

In a second step S2, it is detected whether current accumulation has occurred in the power transistor, and the number of consecutive current pulses contributing to the current accumulation is determined. When the number of consecutive current pulses during which the current accumulation has occurred reaches a preset value, a regulation interval comprising switching periods is triggered, for at least some of which, the leading-edge blanking time is shortened or cancelled. After the regulation interval, the leading-edge blanking time is restored for period-wise overcurrent protection.

During operation of the switched-mode power supply, the power transistor is switched on or off at a predetermined frequency. In each switching period during actual operation of the circuit, a high leading-edge current will occur due to parasitic capacitance. In order to avoid interference from such leading-edge currents, in the first step S1, a leading-edge blanking time is employed to provide period-wise overcurrent protection for currents through the power transistor (also called conduction currents). The period-wise overcurrent protection is implemented so that, in each switching period, after the leading-edge blanking time, overcurrent protection is provided by an overcurrent protection threshold (denoted by $I_{limit\_OCP}$). Specifically, currents flowing through the power transistor are period-wisely limited After the leading-edge blanking time, if a current flowing through the power transistor reaches the overcurrent protection threshold $I_{limit\_OCP}$, the power transistor is switched off, ending a conduction time for the present switching period of the power transistor. As shown in FIG.

1, in the event of an output short-circuit, under the action of the period-wise overcurrent protection, upon elapse of the leading-edge blanking time, the current through the power transistor will ramp to the overcurrent protection threshold $I_{limit\_OCP}$ in a very short time, thus ending the conduction time of the power transistor for the present switching period. As such, the conduction time of the power transistor for each period is a "short conduction time". Here, the "short conduction time" means that the conduction time of the power transistor is slightly greater than or equal to the leading-edge blanking time $t_{LEB1}$.

In order to prevent excessive current accumulation in the power transistor in the event of an output short-circuit, in the second step S2, it is detected whether current accumulation has occurred in the power transistor, and the number of consecutive current pulses contributing to the current accumulation is determined. For example, it may be configured that, when it is detected that one or consecutive two or more current pulses have led to current accumulation, a regulation operation lasting for a regulation interval is triggered. The regulation operation may be specifically implemented so that the regulation interval includes switching periods, for at least some of which, the leading-edge blanking time is shortened or cancelled. That is, the leading-edge blanking time is reduced from the value prior to the regulation interval (referred to as the first leading-edge blanking time $t_{LEB1}$) to a smaller value (referred to as the second leading-edge blanking time $t_{LEB2}$) or 0 (i.e., cancelled). In this way, under the action of the period-wise overcurrent protection, conduction times of the power transistor are effectively shortened in the regulation interval, altering (mitigating or eliminating) the tendency of current accumulation.

The regulation interval may be configured to last for either a fixed duration of time or a fixed number of switching periods. Since the switching period can be calculated from a period of the system clock, the regulation interval may be alternatively determined as a preset number of system clock periods. After the regulation interval, the leading-edge blanking time is restored for period-wise overcurrent protection, i.e., to the value before the regulation interval was triggered. Thus, the first and second steps S1 and S2 can be repeated in cycles until the output short-circuit problem has been resolved. With this output short-circuit protection method, excessive current accumulation in the power transistor can be avoided, preventing damage to the power transistor.

In the above output short-circuit protection method, in the regulation interval, the leading-edge blanking time is shortened for each switching period either by an equal amount or not. For example, the leading-edge blanking time may be shortened to 90% to 10% of the previous value before the regulation interval was triggered. However, the present invention is not so limited, as it is also possible that the leading-edge blanking time may be cancelled (i.e., reduced to 0) for at least some switching periods in the regulation interval to allow overcurrent protection for conduction currents comprising leading-edge currents. In one embodiment, leading-edge blanking time is cancelled for all the switching periods in the regulation interval.

In the above second step S2, the detection of whether current accumulation has occurred in the power transistor may be accomplished by conduction time detection of the power transistor. Specifically, a current pulse flowing through the power transistor may be detected to determine whether it is a short current pulse. If so (i.e., the conduction time of the power transistor is a short conduction time), it is considered that current accumulation has occurred in the present period. If the conduction time is not a short conduction time, it is considered that current accumulation did not occur in the present period.

Figure 3:
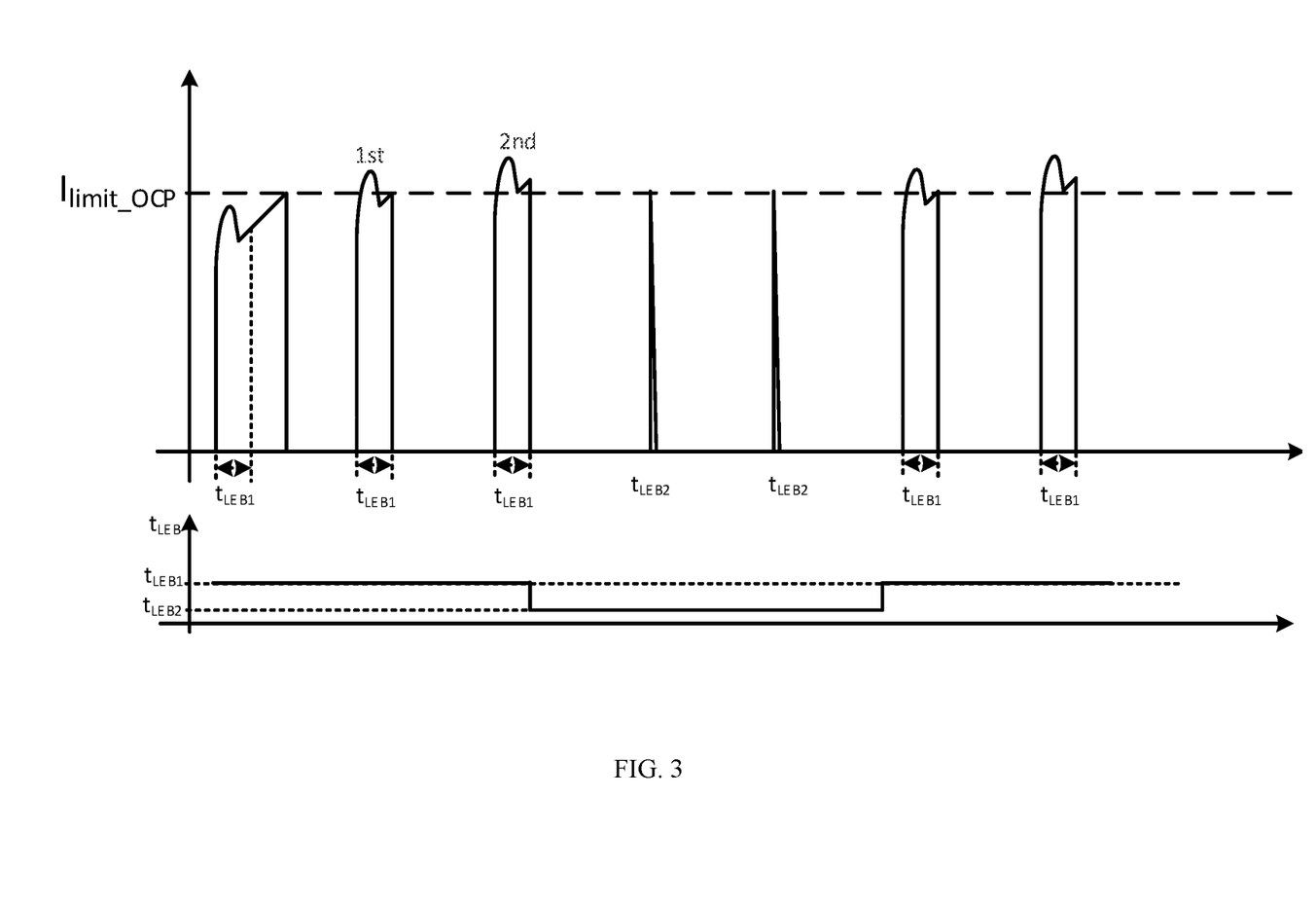
FIG. 3 is a schematic diagram showing current accumulation detection based on short conduction time detection in the output short-circuit protection method according to an embodiment of the present invention.

FIG. 3 is a schematic diagram showing current accumulation detection based on short conduction time detection in the output short-circuit protection method according to an embodiment of the present invention. In FIG. 3, a waveform of current flowing through the power transistor is shown in the upper coordinate system, while variation of the leading-edge blanking time is shown in the lower coordinate system. As shown in FIG. 3, in this embodiment, the first three current pulses are applied with the first leading-edge blanking time $t_{LEB1}$ for period-wise overcurrent protection, and it is found by short conduction time detection that both the second and third current pulses have short conduction times. As an example, it is configured that a regulation interval lasting for two switching periods will be initiated when it is found that the time periods of two consecutive current pulses are short current pulses, then an adjustment is made to the fourth and fifth cure so that the second leading-edge blanking time $t_{LEB2}$ is applied to the fourth and fifth current pulses. As can be seen, under the effect of this period-wise overcurrent protection method, the leading-edge blanking time is shortened for the fourth and fifth current pulses, leading to shorter conduction times of the power transistor. As a result, the tendency of current accumulation is eliminated. After the regulation interval, the leading-edge blanking time is restored to the first leading-edge blanking time $t_{LEB1}$ for the sixth and seventh current pulses. However, if the output short-circuit problem remains unsolved, the sixth and seventh current pulses are still short current pulses. Yet compared to the absence of the regulation interval comprising the fourth and fifth current pulses as shown in FIG. 1, the tendency of current accumulation has been suppressed so that the power transistor will not be damaged due to excessive current accumulation therein.

In the second step S2, the detection of whether current accumulation has occurred in the power transistor may alternatively be accomplished by detecting whether a current flowing through the power transistor reaches a short-circuit protection threshold. The short-circuit protection threshold is denoted as $I_{limit\_SCP}$ and may be determined as needed. The short-circuit protection threshold $I_{limit\_SCP}$ is configured for detection of a current within a conduction time including the leading-edge blanking time. The short-circuit protection threshold $I_{limit\_SCP}$ is for example, higher than the overcurrent protection threshold $I_{limit\_OCP}$ in the first step S1. Specifically, detecting whether a current flowing through the power transistor triggers the short-circuit protection threshold $I_{limit\_SCP}$ means detecting whether the current flowing through the power transistor is higher than the short-circuit protection threshold $I_{limit\_SCP}$. If so, it is considered that current accumulation has occurred in the switching period and thus the conduction time thereof. Otherwise, if the current is lower than the short-circuit protection threshold $I_{limit\_SCP}$, it is considered that the current accumulation has not happened in the switching period and thus the conduction time thereof.

Figure 4:
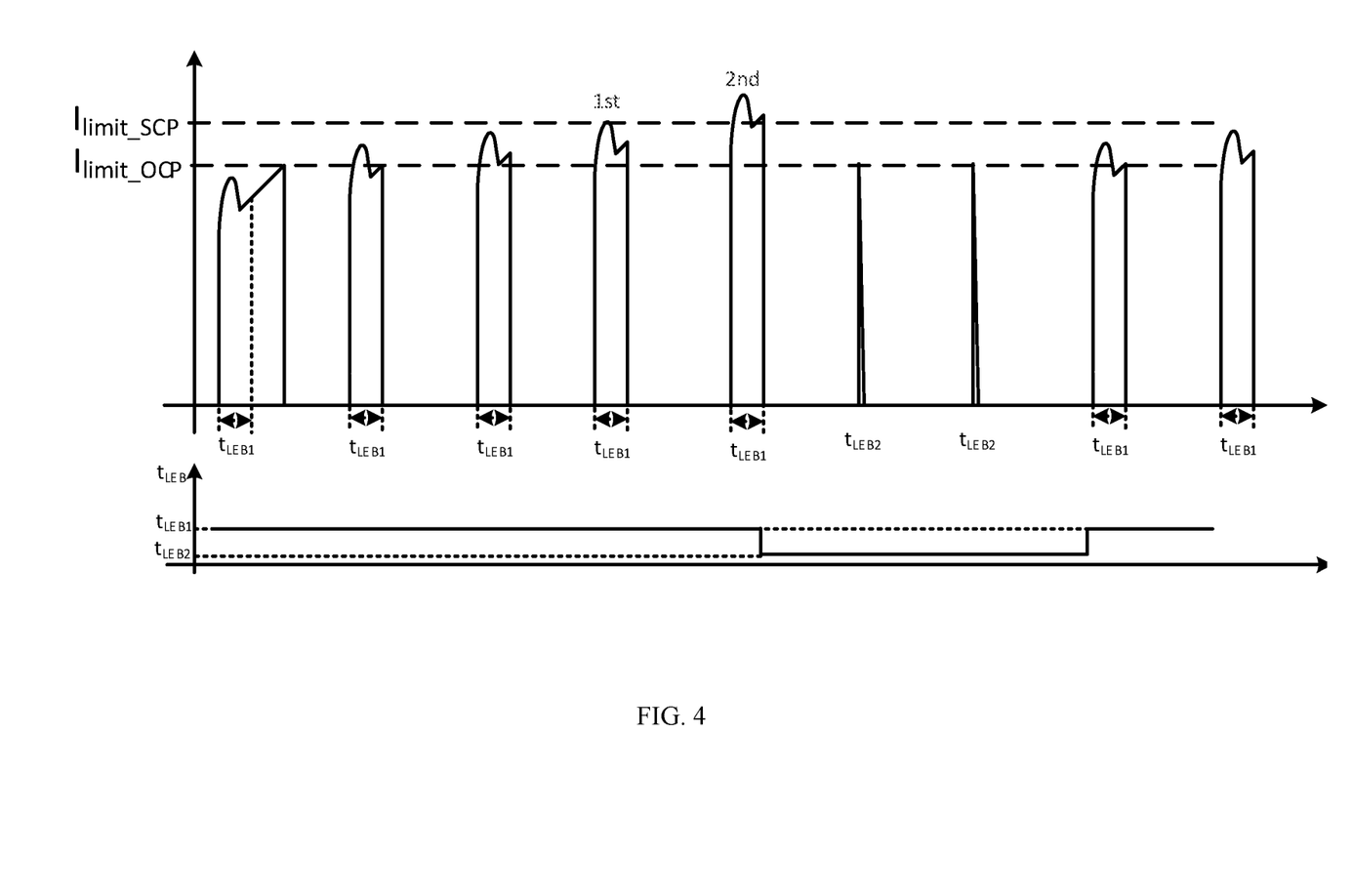
FIG. 4 is a schematic diagram showing current accumulation detection based on short-circuit protection threshold detection in the output short-circuit protection method according to an embodiment of the present invention.

FIG. 4 is a schematic diagram showing current accumulation detection based on short-circuit protection threshold detection in the output short-circuit protection method according to an embodiment of the present invention. Referring to FIG. 4, a current waveform is shown in the upper coordinate system, while variation of the leading-edge blanking time is shown in the lower coordinate system. In this embodiment, the first five current pulses in FIG. 4 are applied with the first leading-edge blanking time $t_{LEB1}$ for period-wise overcurrent protection. Through short-circuit protection threshold detection, it is found that currents of the fourth and fifth current pulses reach the short-circuit protection threshold $I_{limit\_SCP}$. As an example, it is configured that a regulation interval lasting for two switching periods will be initiated when it is found that two consecutive current pulses reaches the short-circuit protection threshold $I_{limit\_SCP}$, then an adjustment is made since the sixth current pulse so that the second leading-edge blanking time $t_{LEB2}$ is applied to the sixth and seventh current pulses. As can be seen, under the effect of this period-wise overcurrent protection method, the leading-edge blanking time is shortened for the sixth and seventh current pulses, leading to shorter conduction times of them. As a result, the tendency of current accumulation is eliminated. After the regulation interval, the leading-edge blanking time is restored to the first leading-edge blanking time $t_{LEB1}$ for the ninth and tenth current pulses. However, if the output short-circuit problem remains unsolved, the ninth and tenth current pulses are still short current pulses. Yet, when compared to the absence of the regulation interval comprising the sixth and seventh current pulses, the tendency of current accumulation has been suppressed so that the power transistor will not be damaged due to excessive current accumulation therein.

Embodiments of the present invention also relate to a power management chip which is provided to control current flowing through a power transistor in a switched-mode power supply so as to avoid excessive current accumulation in the power transistor as a result of an output short-circuit. The power management chip includes a drive generation module and a current accumulation detection module. The drive generation module is configured to use a leading-edge blanking time to provide period-wise overcurrent protection for currents flowing through the power transistor and to generate a control signal for the power transistor. The current accumulation detection module is configured to detect whether current accumulation has occurred in the power transistor and determine the number of consecutive current pulses contributing to the current accumulation. When the number of consecutive current pulses contributing to the current accumulation reaches a preset value, a regulation interval is initiated and the leading-edge blanking time is shortened or cancelled in the regulation interval. After the regulation interval, the leading-edge blanking time is restored to the value prior to the regulation interval.

The current accumulation detection may be accomplished by the current accumulation detection module either by detecting a conduction time of the power transistor or by detecting whether a current flowing through the power transistor reaches a short-circuit protection threshold.

Figure 5A:
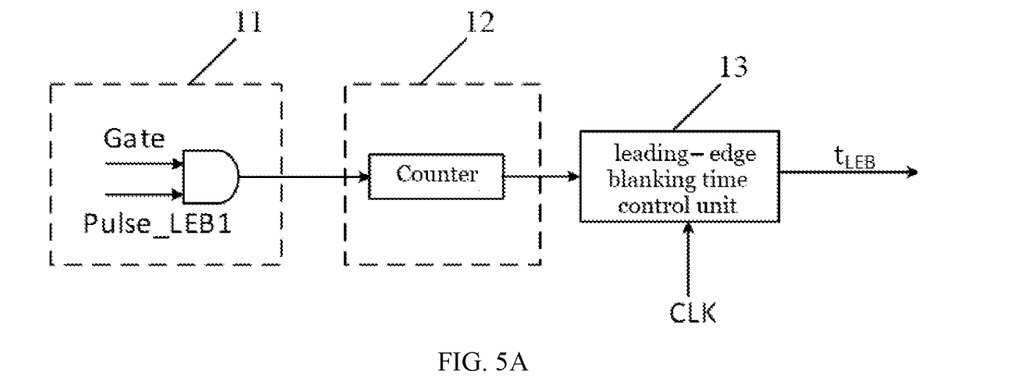
FIGS. 5A and 5B are schematic circuit diagrams of a current accumulation detection module in a power management chip according to embodiments of the present invention.

Specifically, referring to FIG. 5A, in one embodiment, the current accumulation detection module includes a short conduction time detection unit 11, a first counting unit 12 and a leading-edge blanking time control unit 13. The short conduction time detection unit 11 is configured to detect whether a conduction time for the power transistor is a short conduction time. As an example, the short conduction time detection unit 11 includes an AND gate with one terminal receiving a conduction time signal (Gate) from the power transistor and another terminal receiving a preset short conduction time value (Current pulse_LEB1). When a duration value of the conduction time signal from the power transistor is lower than the preset short conduction time value, it is indicated that the conduction time is a short conduction time. The first counting unit 12 for example, includes a counter and is configured to count the number of short current pulses detected by the short conduction time detection unit 11. The leading-edge blanking time control unit 13 is configured to send a leading-edge blanking time ($t_{LEB}$) signal to the drive generation module and, when the counted number generated by the first counting unit 12 reaches a preset value, the leading-edge blanking time $t_{LEB}$ is shortened during a predefined regulation interval.

Figure 5B:
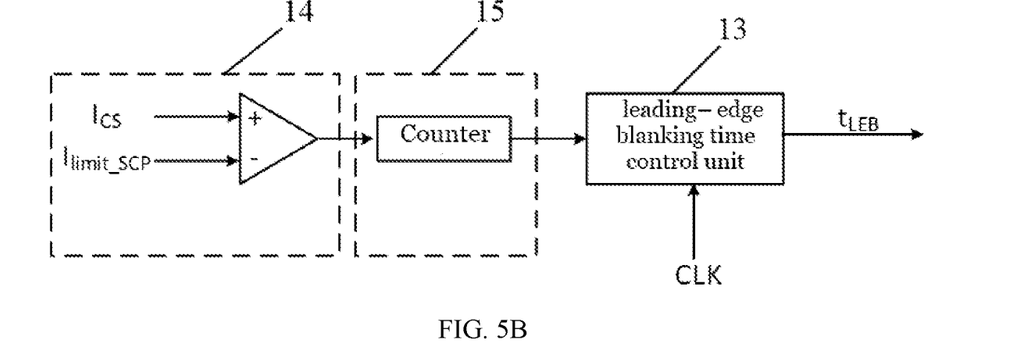

Referring to FIG. 5B, in one embodiment, the current accumulation detection module alternatively includes a short-circuit threshold triggering unit 14, a second counting unit 15 and a leading-edge blanking time control unit 13. The short-circuit threshold triggering unit 14 is configured to detect whether a current flowing through the power transistor triggers a short-circuit protection threshold $I_{limit\_SCP}$. As an example, the short-circuit threshold triggering unit 14 includes a comparator, which receives a current signal ($I_{CS}$) and a short-circuit protection threshold signal ($I_{limit\_SCP}$) and draws a comparison between the two. An output level from the comparator is inverted to provide a trigger if the current $I_{CS}$ is higher than the short-circuit protection threshold $I_{limit\_SCP}$. The second counting unit 15, for example, includes a counter and is configured to count the number of times the short-circuit protection threshold $I_{limit\_SCP}$ is reached as detected by the short-circuit threshold triggering unit 14. The leading-edge blanking time control unit 13 may be structured in the same or similar way as that shown in FIG. 5A. It is configured to send a leading-edge blanking time ($t_{LEB}$) signal to the drive generation module and, when the counted number by the second counting unit 15 reaches a preset value, the leading-edge blanking time $t_{LEB}$ is shortened during a predefined regulation interval.

FIGS. 6A to 6D are schematic circuit diagrams of the power management chip according to embodiments of the present invention. The power management chip according to these embodiments of the present invention will be further explained below with reference to FIGS. 6A to 6D.

Figure 6A:
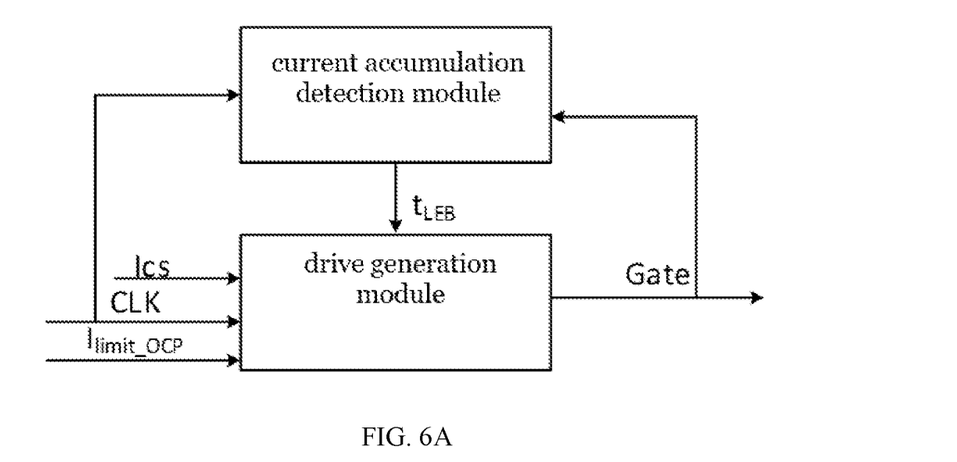
FIGS. 6A to 6D are schematic circuit diagrams of the power management chip according to embodiments of the present invention.

Referring to FIGS. 5A and 6A, in one embodiment, the current accumulation detection module in the power management chip accomplishes current accumulation detection by detecting a conduction time of the power transistor. The current accumulation detection module receives a conduction time signal (Gate) from the power transistor and detects whether there are one or more short current pulses. Based on the detection results, a leading-edge blanking time ($t_{LEB}$) is output to the drive generation module. The drive generation module receives a current signal (Ics), a clock signal CLK, an overcurrent protection threshold signal ($I_{limit\_OCP}$) and the leading-edge blanking time. It utilizes the leading-edge blanking time for period-wise overcurrent protection for currents flowing through the power transistor and generates a control signal for the power transistor. Using the clock signal CLK, the current accumulation detection module may choose to define a length of the aforementioned regulation interval as one or more switching periods of the power transistor. Since the switching period can be calculated from the clock period, the current accumulation detection module may alternatively be configured to define the length of the aforementioned regulation interval as multiple clock periods.

Figure 6B:
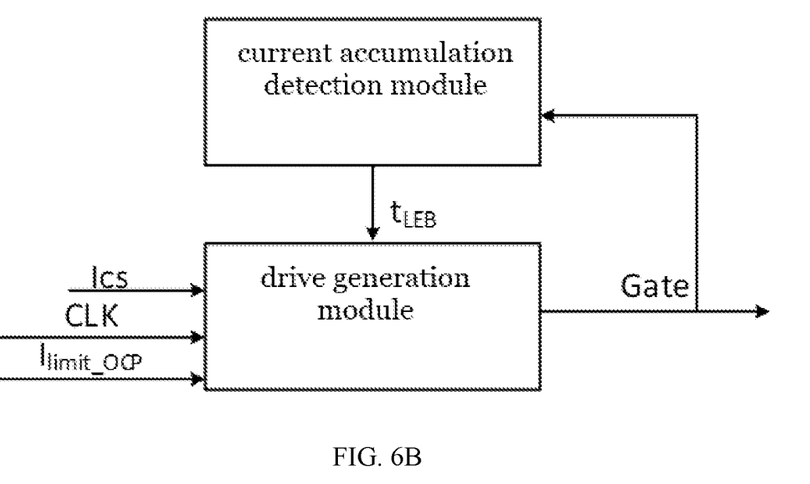

Referring to FIGS. 5A and 6B, in another embodiment, the current accumulation detection module in the power management chip accomplishes current accumulation detection by detecting a conduction time of the power transistor. The current accumulation detection module receives a conduction time signal (Gate) from the power transistor and detects whether there are one or more short current pulses. Based on the detection results, a leading-edge blanking time ($t_{LEB}$) is sent to the drive generation module. The drive generation module receives a current signal (Ics), a clock signal CLK, an overcurrent protection threshold signal ($I_{limit\_OCP}$) and the leading-edge blanking time. It utilizes the leading-edge blanking time for period-wise overcurrent protection for currents flowing through the power transistor and generates a control signal for the power transistor. In this embodiment, the current accumulation detection module does not receive the clock signal CLK. Instead, it defines the length of the aforementioned regulation interval as a fixed length of time (this may be achieved using a timer).

Figure 6C:
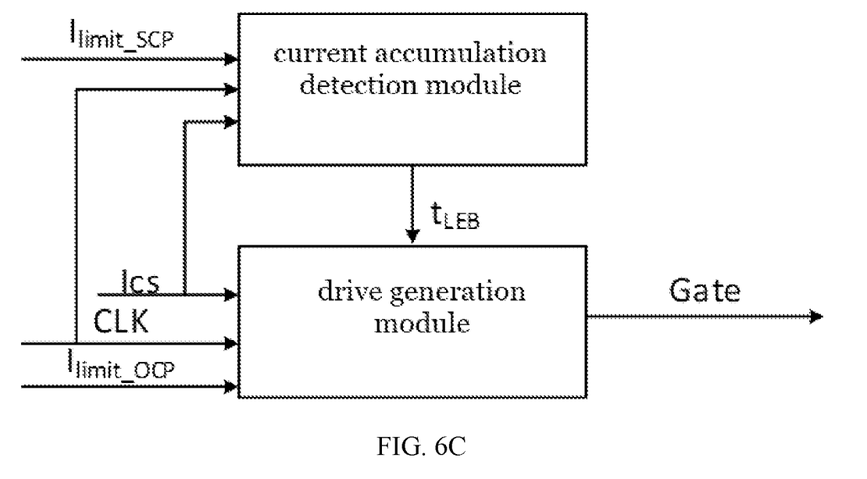

Referring to FIGS. 5B and 6C, in one embodiment, the current accumulation detection module in the power management chip accomplishes current accumulation detection by detecting whether a current flowing through the power transistor triggers a short-circuit protection threshold. The current accumulation detection module receives a current signal (Ics) and a short-circuit protection threshold signal ($I_{limit\_SCP}$) in order to detect whether there are one or consecutive current pulses for the power transistor resulting in currents that trigger the short-circuit protection threshold $I_{limit\_SCP}$. Based on the detection results, a leading-edge blanking time ($t_{LEB}$) is output to the drive generation module. The drive generation module receives the current signal (Ics), a clock signal CLK, an overcurrent protection threshold signal ($I_{limit\_OCP}$) and the leading-edge blanking time. It utilizes the leading-edge blanking time for period-wise overcurrent protection for currents flowing through the power transistor and generates a control signal for the power transistor. The current accumulation detection module also receives the clock signal CLK in order to set the length of the aforementioned regulation interval as one or more switching periods of the power transistor or as multiple clock periods.

Figure 6D:
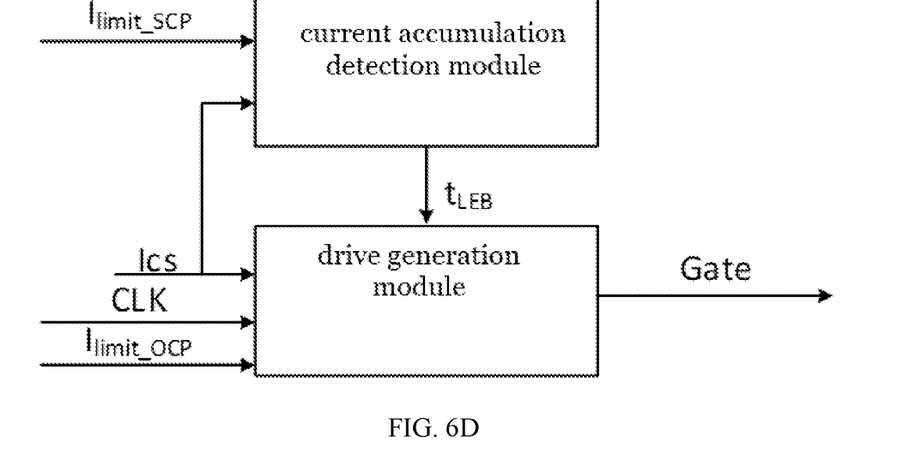

Referring to FIGS. 5B and 6D, in one embodiment, the current accumulation detection module in the power management chip accomplishes current accumulation detection by detecting whether a current flowing through the power transistor triggers a short-circuit protection threshold. The current accumulation detection module receives a current signal (Ics) and a short-circuit protection threshold signal ($I_{limit\_SCP}$) in order to detect whether there are one or consecutive current pulses of the power transistor that trigger the short-circuit protection threshold $I_{limit\_SCP}$. Based on the detection results, a leading-edge blanking time ($t_{LEB}$) is output to the drive generation module. The drive generation module receives the current signal (Ics), a clock signal CLK, an overcurrent protection threshold signal ($I_{limit\_OCP}$) and the leading-edge blanking time. Compared with FIG. 5A, the current accumulation detection module does not receive the clock signal CLK. In this embodiment, the current accumulation detection module may define the length of the aforementioned regulation interval as a fixed length of time (this may be achieved using a timer).

Figure 7:
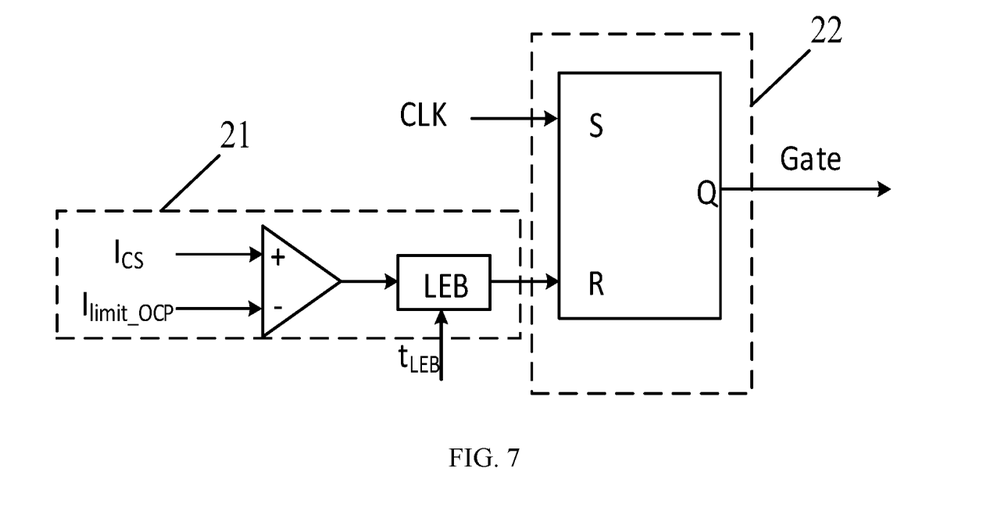
FIG. 7 is a schematic circuit diagram of a drive generation module in the power management chip according to an embodiment of the present invention.

FIG. 7 is a schematic circuit diagram of the drive generation module in the power management chip according to an embodiment of the present invention. Referring to FIG. 7, the drive generation module may include a period-wise overcurrent protection unit 21 and a control signal generation unit 22. The period-wise overcurrent protection unit 21 is configured to utilize the leading-edge blanking time ($t_{LEB}$) sent from the aforementioned current accumulation detection module for period-wise overcurrent protection for currents flowing through the power transistor and generate a trigger signal. The control signal generation unit 22 is configured to receive the trigger signal output from the period-wise overcurrent protection unit 21 and a clock signal (CLK) for controlling an operating frequency of the power transistor and to generate a control signal for the power transistor. As shown in FIG. 7, as an example, the period-wise overcurrent protection unit 21 includes a comparator and a leading-edge blanking (LEB) module. The comparator receives a current signal ($I_{CS}$) and an overcurrent protection threshold signal ($I_{limit\_OCP}$) and is configured to compare the current $I_{CS}$ with the overcurrent protection threshold $I_{limit\_OCP}$. An output level from the comparator is inverted if the current $I_{CS}$ is higher than the overcurrent protection threshold $I_{limit\_OCP}$. The LEB module receives the output signal from the comparator and a leading-edge blanking time signal ($t_{LEB}$) output from the aforementioned current accumulation detection module. Moreover, it blocks the output signal from the comparator within the leading-edge blanking time and sends the output signal from the comparator after the leading-edge blanking time as a trigger signal to the control signal generation unit 22. However, the present invention is not so limited. In another embodiment, the period-wise overcurrent protection unit 21 includes a comparator and an LEB module. The LEB module receives a current signal ($I_{CS}$) and a leading-edge blanking time signal ($t_{LEB}$) output from the aforementioned current accumulation detection module. The LEB module blocks the current signal ($I_{CS}$) within the leading-edge blanking time and sends the current signal ($I_{CS}$) to the comparator after the leading-edge blanking time. The comparator then sends the result as the trigger signal to the control signal generation unit 22. As shown in FIG. 7, the control signal generation unit 22, for example, includes a flip-flop. The flip-flop has a set terminal S for receiving the clock signal CLK and a reset terminal R for receiving the trigger signal sent from the period-wise overcurrent protection unit 21. In this way, it can read the trigger signal based on the clock signal CLK and generate a corresponding output. When the trigger signal generated by the period-wise overcurrent protection unit 21 indicates a current $I_{CS}$ lower than the overcurrent protection threshold $I_{limit\_OCP}$, the output signal from the flip-flop does nothing about the switching on/off of the power transistor. However, when the trigger signal generated by the period-wise overcurrent protection unit 21 indicates the current $I_{CS}$ higher than the overcurrent protection threshold $I_{limit\_OCP}$, the output signal from the flip-flop serves as a control signal for the power transistor to end its current conduction state.

The power management chip according to embodiments of the present invention can be used to implement the output short-circuit protection method as described in the foregoing embodiments. The processes of current accumulation detection and output protection shown in FIGS. 3 and 4 can be implemented by the power management chip as defined here. Reference can be made to the above description in connection with the output short-circuit protection method for details in this regard, and a further detailed description thereof is omitted here.

In different circuit implementations of the power management chip according to embodiments of the present invention, the drive generation module, the current accumulation detection module, the short conduction time detection unit, the first counting unit, the second counting unit, the short-circuit threshold triggering unit, the leading-edge blanking time control unit, the period-wise overcurrent protection unit and the control signal generation unit may have different structures. It would be appreciated that, without departing from the technical principles of the present invention, all these different circuit implementations are also considered to fall within the scope of protection of the invention.

Embodiments of the present invention also relate to a switched-mode power supply, which can employ the output short-circuit protection method described in connection with the above embodiments, or can include the power management chip described in connection with the above embodiments. Using the output short-circuit protection method or the power management chip, the switched-mode power supply can control currents flowing through a power transistor and thus prevent an excessively large current flowing through the power transistor in the event of an output short-circuit.

In the output short-circuit protection method, power management chip and switched-mode power supply according to embodiments of the present invention, through shortening the leading-edge blanking time for at least some switching periods in the regulation interval, a conduction time of the power transistor in the regulation interval is shortened, preventing an excessively large current through the power transistor. Compared with existing measures for power management chips, restart of the power supply and adjustment of the system clock are not needed, allowing easier implementation. Further, the automatic restart during chip start up due to false triggering as found in the existing measures for power management chips is circumvented.

The description presented above is merely of a few preferred embodiments of the present invention and is not intended to limit the scope thereof in any sense. In light of the teachings hereinabove, any person of skill in the art may make various possible variations and changes to the disclosed embodiments without departing from the scope of the invention. Accordingly, any and all such simple variations, equivalent alternatives and modifications made to the foregoing embodiments without departing from the scope of the invention are intended to fall within the scope thereof.

What is claimed is:

1. An output short-circuit protection method for control of currents flowing through a power transistor in a switched-mode power supply, the output short-circuit protection method comprising:
    performing period-wise overcurrent protection for currents flowing through the power transistor using a leading-edge blanking time, detecting whether current accumulation has occurred in the power transistor, counting a number of consecutive current pulses during which the current accumulation has occurred, and when the number of consecutive current pulses reaches a preset value, entering a regulation interval comprising at least one switching period, wherein at least some leading-edge blanking time thereof is shortened or cancelled; and
    after the regulation interval, restoring the leading-edge blanking time for the period-wise overcurrent protection.

2. The output short-circuit protection method of claim 1, wherein the regulation interval lasts for a predetermined length of time or for a predetermined number of switching periods.

3. The output short-circuit protection method of claim 1, wherein detecting whether current accumulation has occurred in the power transistor is accomplished either by detecting a duration of a conduction time for the power transistor and determining the occurrence of current accumulation if the duration is short, or by detecting a current flowing through the power transistor and determining the occurrence of current accumulation if a short-circuit protection threshold is reached.

4. The output short-circuit protection method of claim 3, wherein the period-wise overcurrent protection comprises period-wisely limiting currents flowing through the power transistor using an overcurrent protection threshold by switching off the power transistor if the current flowing through the power transistor reaches the overcurrent protection threshold after the leading-edge blanking time, wherein the short-circuit protection threshold is higher than the overcurrent protection threshold.

5. A power management chip for controlling of currents flowing through a power transistor in a switched-mode power supply, the power management chip comprising:
    a drive generation module configured to perform period-wise overcurrent protection for currents flowing through the power transistor using a leading-edge blanking time and to generate a control signal for the power transistor; and
    a current accumulation detection module configured to detect whether current accumulation has occurred in the power transistor, count a number of consecutive current pulses during which the current accumulation has occurred, enter a regulation interval comprising multiple switching periods if the number of consecutive current pulses reaches a preset value, wherein at least some leading-edge blanking time during the regulation interval is shortened or cancelled, and after the regulation interval, restore the leading-edge blanking time as not be shortened or cancelled.

6. The power management chip of claim 5, wherein the current accumulation detection module comprises:
    a short conduction time detection unit configured to detect whether a conduction time for the power transistor is a short conduction time;
    a first counting unit configured to count the number of consecutive short current pulses detected by the short conduction time detection unit; and
    a leading-edge blanking time control unit configured to send a leading-edge blanking time signal to the drive generation module and, if the counted number generated by the first counting unit reaches the preset value, shorten the leading-edge blanking time during the regulation interval from a value prior to the regulation interval.

7. The power management chip of claim 5, wherein the current accumulation detection module comprises:
    a short-circuit threshold triggering unit configured to detect whether a current flowing through the power transistor reaches a short-circuit protection threshold;
    a second counting unit configured to count the number of consecutive current pulses during which the short-circuit protection threshold is reached as detected by the short-circuit threshold triggering unit; and
    a leading-edge blanking time control unit configured to send a leading-edge blanking time signal to the drive generation module and, if the counted number generated by the second counting unit reaches the preset value, shorten the leading-edge blanking time during the regulation interval from a value prior to the regulation interval.

8. The power management chip of claim 5, wherein the drive generation module comprises:
    a period-wise overcurrent protection unit configured to perform period-wise overcurrent protection during the leading-edge blanking time for current flowing through the power transistor and generate a trigger signal; and
    a control signal generation unit configured to receive the trigger signal and a clock signal for controlling an operating frequency of the power transistor and generate a control signal for the power transistor.

9. The power management chip of claim 5, wherein the regulation interval lasts for a predetermined length of time or for a predetermined number of switching periods.

10. A switched-mode power supply comprising the power management chip as defined in claim 5 for controlling of current flowing through a power transistor and prevention of an excessively large current flowing through the power transistor.

* * * * *